US012812209B2

(12) United States Patent
Ahmed et al.

(10) Patent No.: US 12,812,209 B2
(45) Date of Patent: Nov. 24, 2026

(54) METHODS AND SYSTEMS FOR APPLYING A CONTENT FILTER

(71) Applicant: Comcast Cable Communications, LLC, Philadelphia, PA (US)

(72) Inventors: Feroze Ahmed, Chennai (IN); Ajay Clement Selvaraj, Chennai (IN)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/800,720

(22) Filed: Aug. 12, 2024

(65) Prior Publication Data

US 2026/0046483 A1 Feb. 12, 2026

(51) Int. Cl.

*H04N 21/454* (2011.01)
*H04N 21/44* (2011.01)
*H04N 21/442* (2011.01)

(52) U.S. Cl.

CPC ........... *H04N 21/454* (2013.01); *H04N 21/44* (2013.01); *H04N 21/44218* (2013.01)

(58) Field of Classification Search

CPC ................. H04N 21/454; H04N 21/44; H04N 21/44218; H04N 21/23439
USPC ........................................................... 725/10
See application file for complete search history.

(56) References Cited

U.S. PATENT DOCUMENTS

| | | | | |
|---|---|---|---|---|
| 8,849,199 | B2 | 9/2014 | Shrum, Jr. et al. | |
| 9,231,845 | B1 * | 1/2016 | Goldstein | H04W 4/00 |
| 11,368,751 | B1 | 6/2022 | Dhiman et al. | |
| 2012/0060176 | A1 * | 3/2012 | Chai | H04N 21/25891 725/10 |
| 2018/0279001 | A1 * | 9/2018 | Isbiliroglu | H04N 21/4627 |
| 2021/0014569 | A1 * | 1/2021 | Rishea | H04N 21/42204 |
| 2022/0295131 | A1 | 9/2022 | Shah et al. | |
| 2022/0400301 | A1 | 12/2022 | Aher et al. | |
| 2024/0114191 | A1 * | 4/2024 | Ravuru | G10L 15/22 |
| 2024/0380943 | A1 * | 11/2024 | Emmanuel | H04N 21/4542 |
| 2025/0000448 | A1 * | 1/2025 | Dasher | H04N 21/4396 |
| 2026/0000959 | A1 * | 1/2026 | Chandrashekar | A63B 71/0622 |

* cited by examiner

*Primary Examiner* — Cynthia M Fogg
(74) *Attorney, Agent, or Firm* — Ballard Spahr LLP

(57) ABSTRACT

Methods, apparatuses, and systems are described for applying a content filter to a content item output via a user device. A user device may request a content item and receive a first manifest associated with the content item and a second manifest associated with the content item. The first manifest may be configured to deliver a first version of the content item and the second manifest may be configured to deliver a second version of the content item. Based on the user detected within proximity of the user device, the user device may access one of the manifests to output one of the versions of the content item.

22 Claims, 9 Drawing Sheets

METHODS AND SYSTEMS FOR APPLYING A CONTENT FILTER

BACKGROUND

Video content may be replicated in multiple versions suitable for different audiences. For example, video content for a child may have scenes censored for explicit content as opposed to the original video content that may be displayed without any censored scenes to adult audiences. An audience that consists of a mixture of adults and children watching a single display device may experience a censored version of a video content despite adults in the audience due to the presence of children in the audience. However, users are more consistently watching video content on their own devices. As such, the child's device will present censored content while the adult's device will present uncensored content. Unfortunately, when an adult and a child are watching their own devices sitting next to other, the child may be exposed to the uncensored content due to the close proximity to the adult's device that is presenting the uncensored content.

SUMMARY

It is to be understood that both the following general description and the following detailed description are examples and explanatory only and are not restrictive. Methods, systems, and apparatuses for applying a content filter to video content.

A user device may request a content item and receive a first manifest associated with the content item and a second manifest associated with the content item based on the request. The first manifest may be configured to deliver a first version of the content item and the second manifest may be configured to deliver a second version of the content item. The first version of the content item may comprise an unfiltered version of the content item and the second version of the content item may comprise a filtered version of the content item. Based on the user detected within proximity of the user device, the user device may access one of the manifests to output one of the versions of the content item. The user device may initially access the first manifest to output the unfiltered version of the content item based on detecting an adult in proximity of the user device. If a child is subsequently detected in proximity of the user device, the user device may subsequently access the second manifest to output the filtered version of the content item.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
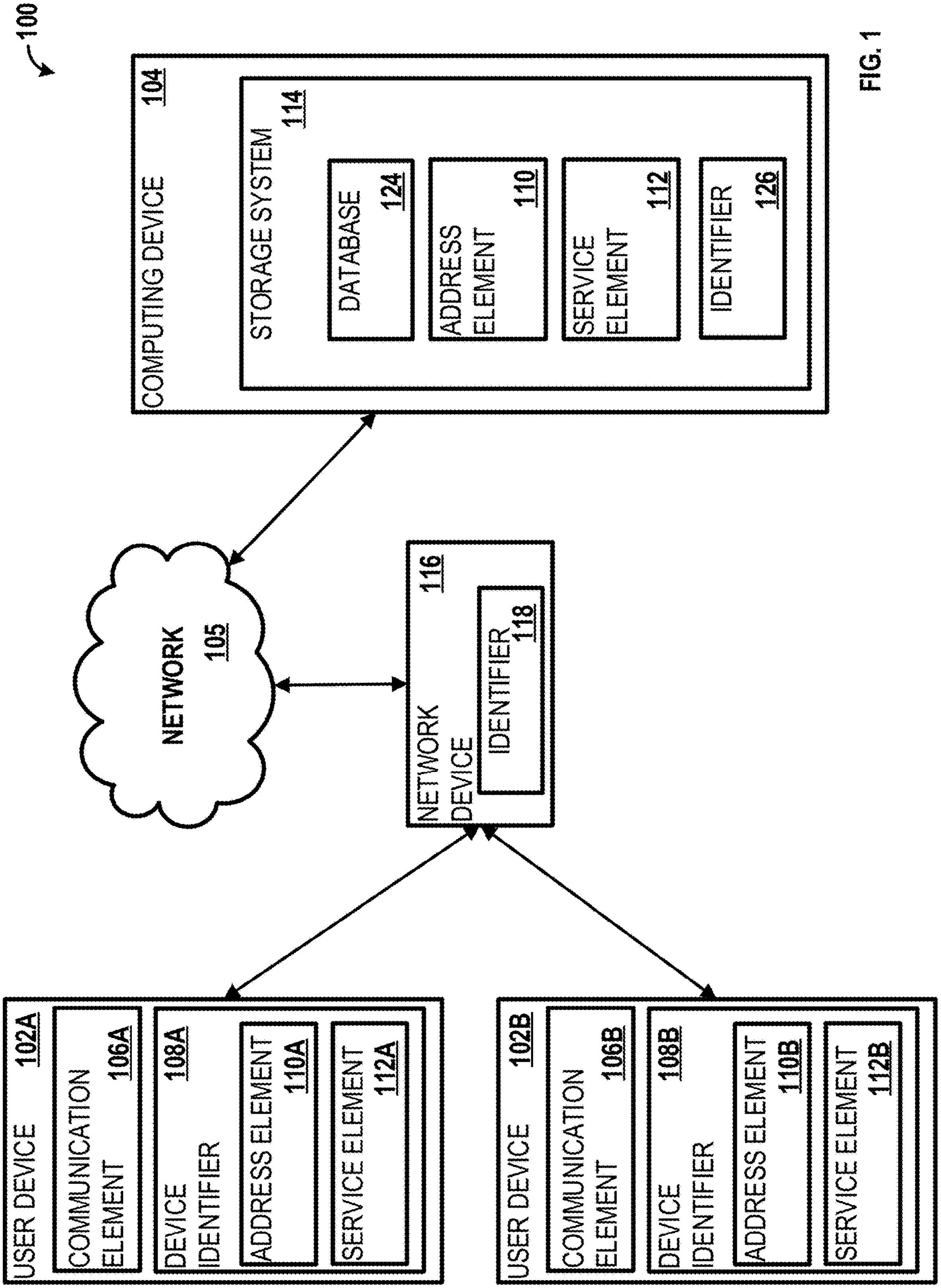
FIG. 1 shows an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

FIG. 1 shows an example system 100 for applying a content filter to a content item output via a user device. For example, the system 100 may be configured to detect a user in proximity to the user device. Based on the detected user (e.g., an adult user or a child user), the user device may access a manifest to output a version of a requested content item. The network and system 100 may be configured to provide services, such as network-related services, to a device (e.g., devices 102A-102B). The system 100 may comprise one or more devices 102A-102B in communication with a network device 116, such as a wireless access point (e.g., gateway device) and/or a LTE back-up device, for example. The computing device 104 may be disposed locally or remotely relative to the devices 102A-102B. The network device 116 may facilitate access to the network 105 for the devices 102A-102B and/or the computing device 104. For example, the devices 102A-102B and the computing device 104 may be in communication via a private and/or public network 105 such as the Internet or a local area network (LAN) via the network device 116. The network device 116 may be in communication with a computing device 104 such as a centralized device or a server, for example. Other forms of communications can be used such as wired and wireless telecommunication channels.

The devices 102A-102B may comprise electronic devices such as a computer, a smartphone, a laptop, a tablet, a set top box, a display device, a printer, a telephone, a network device, a communication terminal, a transmitter, or other device capable of communicating with the network device 116. As an example, the devices 102A-102B may comprise communication elements 106A-106B for offering an interface to a user to interact with the devices 102A-102B and/or the computing device 104. The communication element 106A-106B can be any interface for presenting and/or receiving information to/from the user, such as media content. An example interface may be a communication interface such as a web browser (e.g., Internet Explorer®, Mozilla Firefox®, Google Chrome®, Safari®, or the like). Other software, hardware, and/or interfaces can be used to facilitate communication between the user and one or more of the devices 102A-102B and the network device 116. As an example, the communication elements 106A-106B can request or query various files from a local source and/or a remote source. As an example, the communication element 106A-106B can transmit data to a local or remote device such as the network device 116 or the computing device 104 via the network device 116.

The devices 102A-102B may be associated with user identifiers or device identifiers 108A-108B. As an example, the device identifiers 108A-108B may be any identifier, token, character, string, or the like, for differentiating one user or user device (e.g., a user device 102A) from another user or user device. The device identifier 108A-108B may identify a user or user device as belonging to a particular class of users or user devices. As an example, the device identifier 108A-108B may comprise information relating to the user device such as a manufacturer, a model or type of device, a service provider associated with the device 102A-102B, a state of the device 102A-102B, a locator, and/or a label or classifier. Other information can be represented by the device identifiers 108A-108B.

The device identifiers 108A-108B may comprise address elements 110A-110B and service elements 112A-112B. The address elements 110A-110B may comprise or make available an internet protocol address, a network address, a media access control (MAC) address, an Internet address, or the like. As an example, the address elements 110A-110B may be relied upon to establish a communication session between the devices 102A-102B and the network device 116 or other devices and/or networks. As an example, the address elements 110A-110B may be used as an identifier or locator of the user devices 102A-102B. The address elements 110A-110B may be persistent for a particular network.

The service elements 112A-112B may comprise identification of the service providers associated with the devices 102A-102B and/or with the class of devices 102A-102B. The class of the devices 102A-102B may be related to a type of device, a capability of a device, a type of service being offered, and/or a level of service (e.g., a business class, a service tier, a service package, etc.). As an example, the service elements 112A-112B may comprise information relating to or made available by a communication service provider (e.g., an Internet service provider) that is offering or enabling data flow such as communication services to the devices 102A-102B. As an example, the service elements 112A-112B may comprise information relating to a preferred service provider for one or more particular services relating to the devices 102A-102B. The address elements 110A-110B may be used to identify or retrieve data from the service elements 112A-112B, or vice-versa. As an example, one or more of the address elements 110A-110B and the service elements 112A-112B can be stored remotely from the devices 102A-102B and retrieved by one or more devices such as the devices 102A-102B and the computing device 104. Other information can be represented by the service element 112A-112B.

The network device 116 may be in communication with a network, such as network 105. The network device 116 may be configured to allow one or more wireless devices to connect to a wired and/or wireless network using Wi-Fi, Bluetooth®, Zigbee®, or any desired method or standard. As an example, the network device 116 may be configured to facilitate the connection of a device, such as the device 102A-102B, to the network 105. The network device 116 may be configured as one or more of a set top box, a wireless access point (WAP), a gateway device, a combination thereof, or any device capable of providing content to a display device (e.g., devices 102A-102B). In an example, the network device 116 may be configured as a set top box configured to output content items to a display device (e.g., devices 102A-102B). In an example, the network device 116 may be configured as a WAP to provide access to a wide area network (e.g., the Internet). For example, the network device 116 may be configured to access the wide area network via a computing device (e.g., computing device 104, server, headend, Internet service provider, etc.). In an example, the network device 116 may be configured to perform one or more gateway functions in order to provide the access to the wide area network. The one or more gateway functions may comprise one or more of network traffic routing, dynamic host configuration protocol (DHCP) management, VoIP functions, or IP streaming functions. In an example, the network device 116 may be configured as a local network (e.g., local area network (LAN)) to provide, to the devices 102A-102B access to the wide area network via the local network.

The network device 116 may comprise an identifier 118. As an example, one or more identifiers can be or relate to an Internet Protocol (IP) Address IPV4/IPV6 or a media access control address (MAC address) or the like. As a further example, the identifier 118 may be unique identifiers for facilitating communications on the physical network segment. Each of the network device 116 may comprise an identifier 118 that is distinct. As an example, the identifier 118 may be associated with a physical location of the network device 116.

One or more devices (e.g., device 102A, device 102B, network device 116, etc.) may be configured to access a manifest to output a version of a requested content item. For example, based on the detection of a type of user (e.g., an adult user and/or a child user) in proximity of the one or more devices, a version (e.g., filtered, unfiltered, etc.) of a content item may be output to the user. For example, it may be desired that a child user be restricted from consuming explicit content. Therefore, parental controls may be implemented to control, or filter, the output of explicit content to child users. In some situations, each user may enjoy content on his/her own device. As an example, an adult user may enjoy the consumption of unfiltered content while a child user may be restricted to viewing a filtered version of the content. In order to prevent a child from viewing the unfiltered version of the content being output on the adult user's device, if a child user is detected entering the proximity of the adult user's device, the adult user's device may switch to the filtered version of the content.

In an example, an adult user may be initially detected within proximity of a device (e.g., device 102A, device 102B, network device 116, etc.) and a child user may subsequently enter the proximity of the device. Based on initially detecting the adult user, the device may access a manifest associated with an unfiltered version of a requested content item to output the unfiltered version of the content item to the adult user. After detecting the child user in proximity of the device, the device may access a manifest associated with a filtered version of the content item to output the filtered version of the content item to the adult user and the child user. For example, the device may send a request for a content item (e.g., to computing device 104). The device may receive a first manifest associated with the content item and a second manifest associated with the content item. As an example, the user device may store and maintain the first manifest and the second manifest. The first manifest may facilitate delivery of a first version of the content item to the user device and the second manifest may facilitate delivery of a second version of the content item to the user device. The first version of the content item may comprise an unfiltered version of the content item (e.g., associated with an adult version of the content item) and the second version of the content item may comprise a filtered version of the content item (e.g., associated with a child version of the content item). As an example, the filtered version of the content item may comprise the content item with one or more filtered portions of the content item that contain explicit content. A first user may be detected within a proximity of the device (e.g., via one or more sensor devices). For example, users may be detected within a proximity of a device based on one or more of detecting a proximity of a user device of a user, Wi-Fi sensing, capturing a sound of a user, or capturing an image of a user. The device may access the first manifest based on the first user, wherein the first manifest may cause the device to output the first version of the content item. For example, the device may access the first manifest based on determining that the first user is an adult user. During the output of the first version of the content item, a second user may be detected within proximity of the device. Based on the second user during the output of the first version of the content item, the device may access the second manifest, wherein the second manifest may cause the device to output the second version of the content item. For example, the device may access the second manifest based on determining that the second user is a child user. For example, the device may output the second version of the content item at a time point in the content item associated with the detection of the second user within the proximity of the user device during the output of the first version of the content item.

In an example, an adult user and a child user may be initially detected within proximity of a device (e.g., device 102A, device 102B, network device 116, etc.) and the child user may subsequently leave the proximity of the device while a content item is being output by the device. Based on the child user being detected with the adult user, the device may access a manifest associated with a filtered version of a requested content item to output the filtered version of the content item to the child user and the adult user. After detecting that the child user has left the proximity of the device, the device may access a manifest associated with an unfiltered version of the content item to output the unfiltered version of the content item to the adult user. For example, the device may send a request for a content item (e.g., to computing device 104). The device may receive a first manifest associated with the content item and a second manifest associated with the content item. The first manifest may facilitate delivery of a filtered version of the content item to the user device and the second manifest may facilitate delivery of an unfiltered version of the content item to the user device. A plurality of users may be detected within proximity to the user device. Based on the plurality of users, the device may access the first manifest, wherein the first manifest may cause the user device to output the filtered version of the content item. For example, the device may access the first manifest based on detecting that at least one user of the plurality of users is a child user. During the output of the first version of the content item, it may be determined (e.g., via detecting the users within proximity of the device) that one or more users of the plurality of users have left the proximity of the device. Based on the one or more users that left the proximity of the device, the user device may access the second manifest, wherein the second manifest may cause the user device to output the unfiltered version of the content item. For example, the device may access the second manifest based on determining that each of the one or more users comprise a child user and that the remaining users of the plurality of users in proximity of the device comprise adult users. For example, the device may output the unfiltered version of the content item at a time point in the content item associated with the detection of the one or more users leaving the proximity of the device during the output of the filtered version of the content item.

The computing device 104 may comprise a server, or a centralized device, for communicating with the network device 116, or the devices 102A-102B via the network device 116. In an example, the computing device 104 may communicate with the devices 102A-102B for offering data and/or services. For example, the computing device 104 may offer services such as network (e.g., Internet) connectivity, network printing, media management (e.g., a media server), interference management, content services, streaming services, broadband services, or other network-related services.

The computing device 104 may allow the devices 102A-102B to interact with remote resources such as data, devices, and files. As an example, the computing device 104 may be configured as (or disposed at) a central location (e.g., a headend, or a processing facility), which can receive content (e.g., data, input programming) from multiple sources. The computing device 104 may be a separate/remote device from the headend, for example. The computing device 104 can combine content from the multiple sources and may distribute the content to user (e.g., subscriber) locations via a distribution system.

The computing device 104 may be configured to manage the communication between the devices 102A-102B and/or the network device 116 and a storage system 114 for sending and receiving data therebetween. As an example, the storage system 114 may store a plurality of files, user identifiers or records, or other information. As a further example, the devices 102A-102B may request and/or retrieve one or more files from the storage system 114. The storage system 114 may include a database 124. The computing device 104 may store a plurality of manifest files associated with a plurality of versions (e.g., filtered, unfiltered, etc.) of content items in the database 124. In an example, the plurality of manifest files may include custom manifest files associated with custom versions of the content items. For example, one or more portions of the custom versions of the content items may include additional content (e.g., advertisements, supplemental content, etc.). The different versions of the content items may be accessed (e.g., via the computing device 104) based on user profiles associated with users detected within proximity to a user device (e.g., devices 102A-102B, network device 116, etc.). The user device may access the database 124 to retrieve one or more of the manifest files based on a request for a content item. For example, the user device may retrieve the manifest files associated with an adult version, a child version of the content item and/or one or more custom versions of the content item. As an example, a priority may be assigned to different users, and/or different user profiles. Based on the users detected, and the priority of the users, or user profiles, the user device may access a manifest file associated with a user profile associated with the highest priority to output the associated version of the content item. In an example, the user profiles may be stored in the database 124. The user device may access the database 124 via the computing device 104 to retrieve the user profiles associated with the user(s) detected in proximity to the user device.

The computing device 104 may be configured to provide the manifests and output (e.g., stream) the content items to the user device. For example, the user device may send a request for a content item to the computing device 104. Based on a user detected within a proximity of the user device, the user device may access a manifest to retrieve a version of the content item (e.g., one or more portions of the content item) from the computing device 104. For example, based on a request from a user device for a content item, the computing device 104 may send a first manifest associated with the content item and a second manifest associated with the content item, wherein the user device may store the first manifest and the second manifest. The first manifest may facilitate delivery of a first version of the content item to the user device and the second manifest may facilitate delivery of a second version of the content item to the user device. The computing device 104 may receive a request for the first version of the content item from the user device. Based on the request for the first version of the content item, the computing device 104 may send a first portion of the content item to the user device, wherein the user device may output the first portion of the content item. For example, the user device may access the first manifest to send a request to the computing device 104 for the first portion of the content item based on detecting a first user within proximity of the user device. Subsequently, the computing device 104 may receive a request from the user device for a second portion of the content item associated with the second version of the content item. Based on the request for the second portion of the content item, the computing device 104 may send the second portion of the content item to the user device, wherein the user device may output the second portion of the content item. For example, the user device may access the second manifest to send a request to the computing device 104 for the second portion of the content item based on detecting a second user within proximity of the user device during the output of the first version of the content item. One or more of the first version or the second version may be associated with an adult version of the content item comprising an unfiltered version of the content item or a child version of the content item comprising a filtered version of the content item. One or more of the first user or the second user may comprise an adult user or a child user. As an example, based on a determination that the first user comprises an adult user, the user device may send to the computing device 104 a request for the adult/unfiltered version of the content item based on accessing a manifest associated with the adult/unfiltered version of the content item. Subsequently, if the user device detects a child user during output of the adult/unfiltered version of the content item, the user device may send to the computing device 104 a request for a child/filtered version of the content item based on accessing a manifest associated with the child/filtered version of the content item. As an example, based on a determination that the first user comprises a child user, the user device may send to the computing device 104 a request for the child/filtered version of the content item based on accessing a manifest associated with the child/filtered version of the content item. Subsequently, if the user device detects that a child user has left proximity of the user device and only an adult user remains in proximity of the user device, during output of the child/filtered version of the content item, the user device may send to the computing device 104 a request for an adult/unfiltered version of the content item based on accessing a manifest associated with the adult/unfiltered version of the content item. The second portion of the content item may be associated with a time point of the content item associated with the detection of the second user within proximity of the user device during the output of the first version of the content item.

The storage system 114 may store information relating to the devices 102A-102B such as the address elements 110A-110B and/or the service elements 112A-112B. As an example, the computing device 104 may obtain the device identifiers 108A-108B from the devices 102A-102B and retrieve information from the storage system 114 such as the address elements 110A-110B and/or the service elements 112A-112B. As a further example, the computing device 104 may obtain the address elements 110A-110B from the devices 102A-102B and may retrieve the service elements 112A-112B from the storage system 114, or vice versa. Any information can be stored in and retrieved from the storage system 114. The storage system 114 can be disposed remotely from the computing device 104 and accessed via direct or indirect connection. The storage system 114 can be integrated with the computing device 104 or some other device or system.

Figure 2:
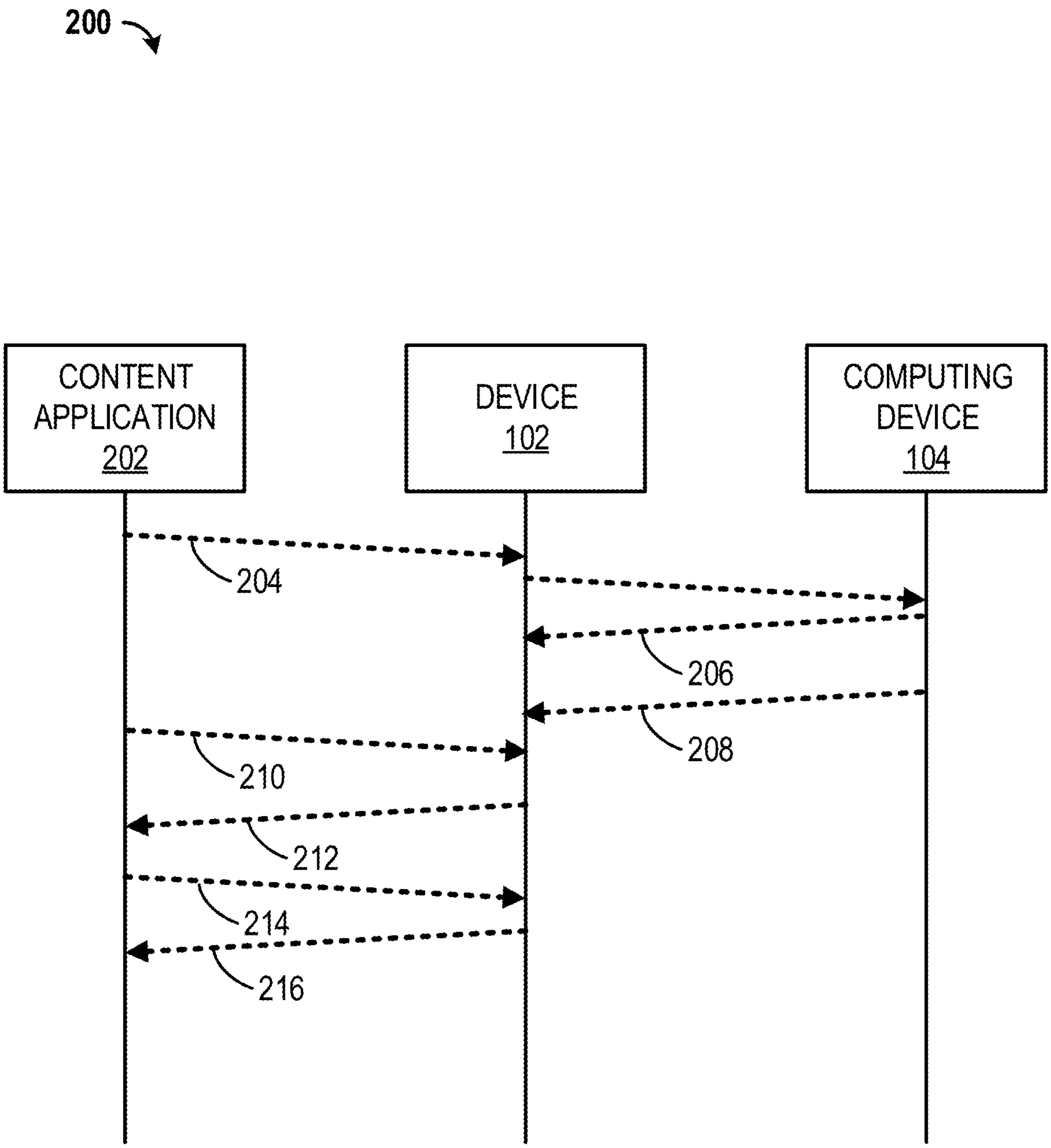
FIG. 2 shows an example process.

FIG. 2 shows an example process 200 for applying a content filter to a content item output via a user device (e.g., device 102). As an example, the device 102 may include a content application 202, which may be partially or fully executed in a device environment. The application 202 may be configured to facilitate access to content (e.g. based on accessing a manifest), and also render content or provide rendering instructions for the content. The device 102 may be in communication (e.g., via a network) with the computing device 104 (e.g., server, headend, etc.). At 204, the content application 202 may send a request for a content item, which may be forwarded by the device 102 to the computing device 104. Based on the request, the computing device 104 may send a first manifest associated with the content item at 206 and a second manifest associated with the content item at 208. As an example, the device 102 may store and maintain the first manifest and the second manifest. The first manifest may facilitate delivery of a first version of the content item to the device 102 and the second manifest may facilitate delivery of a second version of the content item to the device 102. As an example, one or more of the first version of the content item or the second version of the content item may comprise an unfiltered version of the content item (e.g., associated with an adult version of the content item) or a filtered version of the content item (e.g., associated with a child version of the content item). The filtered version of the content item may comprise the content item with one or more filtered portions of the content item that contain explicit content.

At 210, the content application 202 may access the first manifest (e.g., stored on the device 102) based on a first user detected (e.g., via one or more sensor devices) within proximity of the device 102 for retrieving the first version of the content item. For example, users may be detected within a proximity of a device based on one or more of detecting a proximity of a user device of a user, Wi-Fi sensing, capturing a sound of a user, or capturing an image of a user. For example, using a URL or other reference in the first manifest, the content application 202 may generate a request for a portion of the content item. As an example, the first version of the content item may comprise the unfiltered version of the content item, wherein the content application 202 may access the first manifest based on a determination that the first user detected within proximity of the device 102 comprises an adult. As an example, the first version of the content item may comprise the filtered version of the content item, wherein the content application 202 may access the first manifest based on a determination that the first user detected within proximity of the device 102 comprises a child.

At 212, the content application 202, may retrieve and output a first portion of the content item based on the first manifest. For example, based on sending the request (e.g., via the URL or other reference in the first manifest) for the first portion of the content item, the content application 202 may retrieve and output the first portion of the content item. In an example, the first portion of the content item may be stored in a cache of the device 102, wherein the content application 202 may retrieve the first portion of the content item from the cache of the device 102. In an example, the computing device 104 may provide the first portion of the content item to the device 102 that is retrieved by the content application 202.

At 214, the content application 202 may access the second manifest (e.g., stored on the device 102) based on a second user detected (e.g., via one or more sensor devices) within proximity of the device 102 for retrieving the second version of the content item. For example, using a URL or other reference in the second manifest, the content application 202 may generate a request for a second portion of the content item associated with the second version of the content item. As an example, the second version of the content item may comprise the filtered version of the content item, wherein the content application 202 may access the second manifest based on a determination that the second user detected within proximity of the device 102 comprises a child. As an example, the second version of the content item may comprise an unfiltered version of the content item, wherein the content application 202 may access the second manifest based on a determination that the second user detected within proximity of the device 102 comprises an adult and no other users detected within proximity of the device 102 comprise a child.

At 216, the content application 202, may retrieve and output a second portion of the content item based on the second manifest. For example, based on sending the request (e.g., via the URL or other reference in the first manifest) for the second portion the content item, the content application 202 may retrieve and output the second portion of the content item. In an example, the second portion of the content item may be stored in a cache of the device 102, wherein the content application 202 may retrieve the second portion of the content item from the cache of the device 102.

In an example, the computing device 104 may provide the second portion of the content item to the device 102 that is retrieved by the content application 202.

Figure 3A:
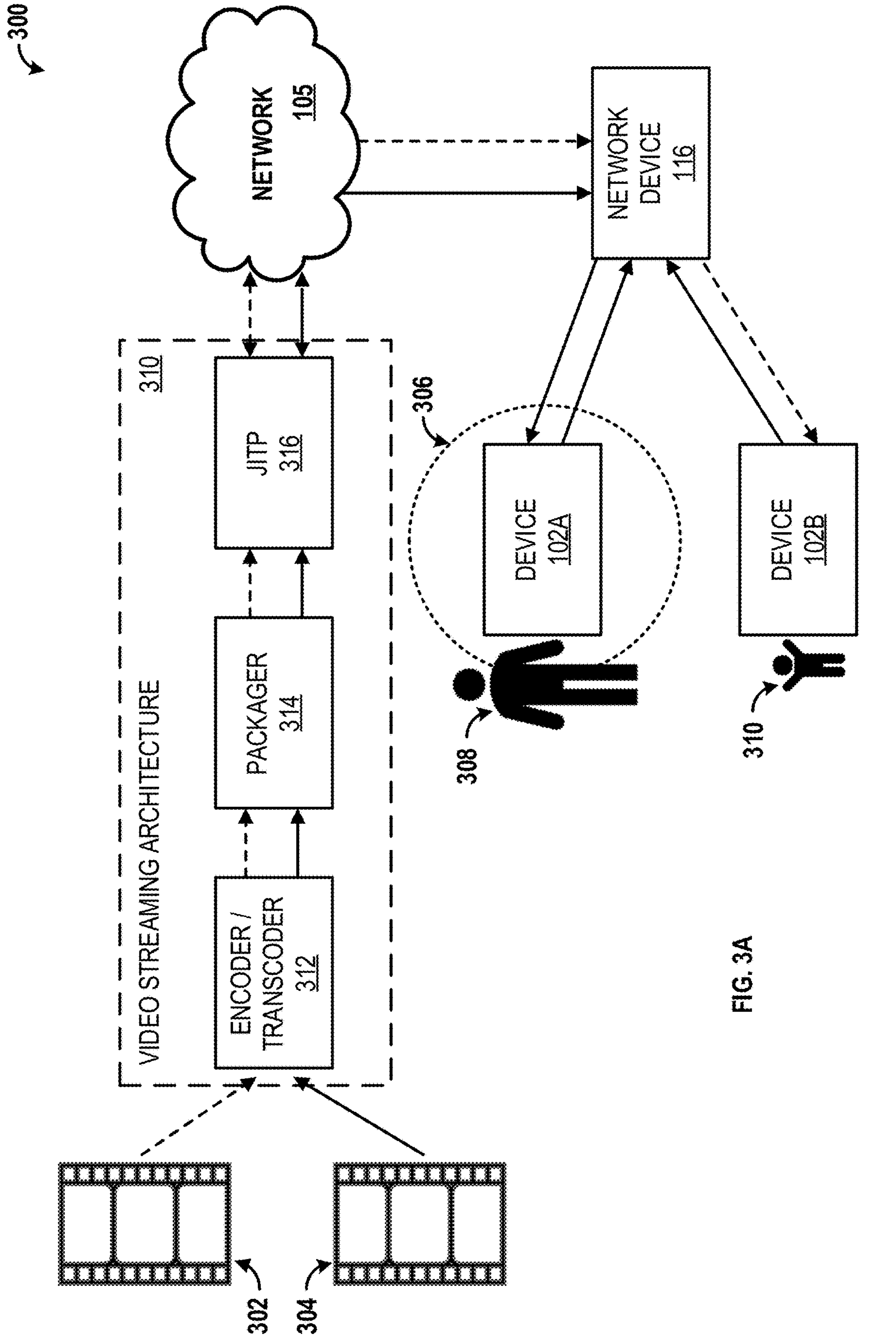
FIGS. 3A-3B show example scenarios.
Figure 3B:
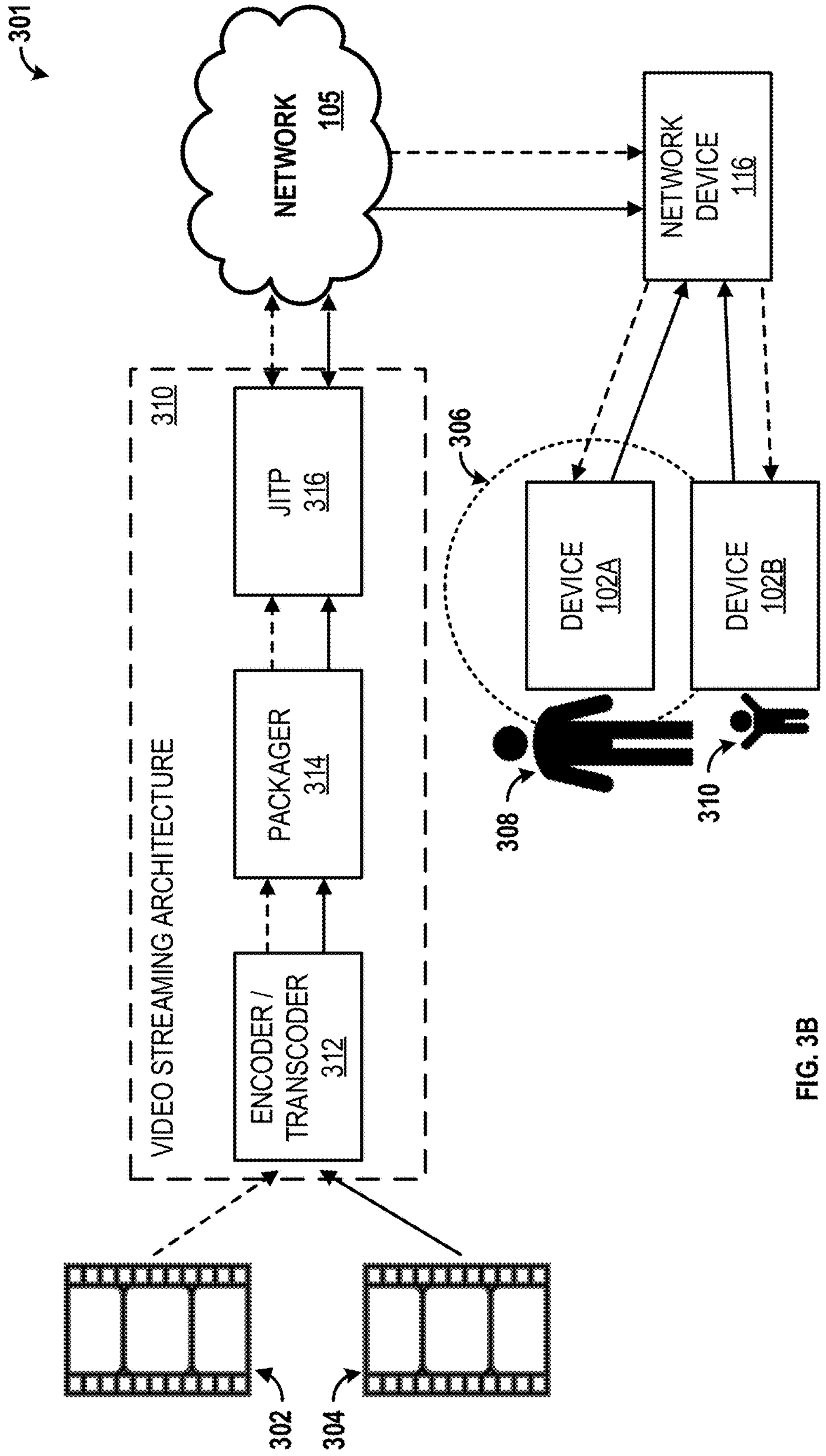

FIGS. 3A and 3B show example scenarios 300/301 for applying a content filter to a content item output via a user device. As shown in FIGS. 3A and 3B, a first version 302 (e.g., an unfiltered version) of a content item and a second version 304 (e.g., a filtered version) of the content item may be provided to video streaming architecture 310. As an example, the video streaming architecture 310 may be included in a computing device (e.g., computing device 104). The video streaming architecture 310 may comprise an encoder/transcoder 312, a packager 314, and a just-in-time packaging (JITP) module 310. The first version 302 and the second version 304 may be provided to the encoder/transcoder 312. The encoder/transcoder 312 may be configured to encode the first version 302 and the second version 304 into one or more compressed formats. For example, the encoder/transcoder 312 may convert the first version 302 and the second version 304 from a first video format (e.g., H.264, MPEG-4 Part 2, MPEG-2) to a second video format (e.g., H.264/MPEG-AVC, H.265/MPEG-HEVC, MPEG-5 EVC, H.266/MPEG-VVC, AV1, VP9, Global motion compensation (GMC), etc.). In addition, the encoder/transcoder 312 may be configured to encode the first version 302 and the second version 304 into one or more bit rates for streaming the content item to a user device (e.g., devices 102A-102B, network device 116, etc.).

The packager 314 may be configured to segment the first version 302 and the second version 304 into one or more video fragments for further processing.

The JITP module 316 may be configured to further package the first version 302 and the second version 304 for protecting (e.g., digital rights management (DRM)) the first version 302 and the second version 304. As an example, the first version 302 and the second version 304 may be encrypted (e.g., in multiple DRM formats) before streaming to the user devices. Furthermore, the JITP module 316 may be configured to generate at least a first manifest and a second manifest for facilitating the delivery of the first version 302 of the content item and the second version 304 of the content item to the user devices (e.g., devices 102A-102B, network device 116, etc.). For example, the manifests may include URLs or other references for requesting the one or more fragments of the different versions of the content item. For example, each manifest may comprise a network location (e.g., a hyper-text transfer protocol (HTTP) uniform resource locator (URL) link or other universal resource identifier (URI)) for each fragment from which the portion may be downloaded, accessed, or retrieved. For example, the network locations may reference a storage location of the one or more fragments of the content item. The packaged content (e.g., the first version 302 and the second version 304), including the manifests, may be provided to a network (e.g., network 105 or other content delivery network (CDN)) to be provided to a user device (e.g., devices 102A-102B, network device 116, etc.). The user device may retrieve and store the manifest associated with a requested content item.

As shown in scenario 300 in FIG. 3A, the device 102A may be associated with an adult user 308 and the device 102B may be associated with a child user 310. The device 102A may access the first manifest, associated with the first version 302 (e.g., unfiltered version) of the content item, based on the adult user 308 within proximity 306 of the device 102A, and retrieve and output the first version 302 of the content item. The device 102B may access the second manifest, associated with the second version 304 (e.g., filtered version) of the content item, based on the child user 310 of the device 102B, and retrieve and output the second version 304 of the content item. As shown in scenario 301 in FIG. 3B, the child user 310 may enter into the proximity 306 of the device 102A. Based on detecting the child user 310 in the proximity 306 of the device 102A, the device 102A may access the second manifest, associated with the second version 304 of the content item, and retrieve and output the second version 304 of the content item.

Figure 4:
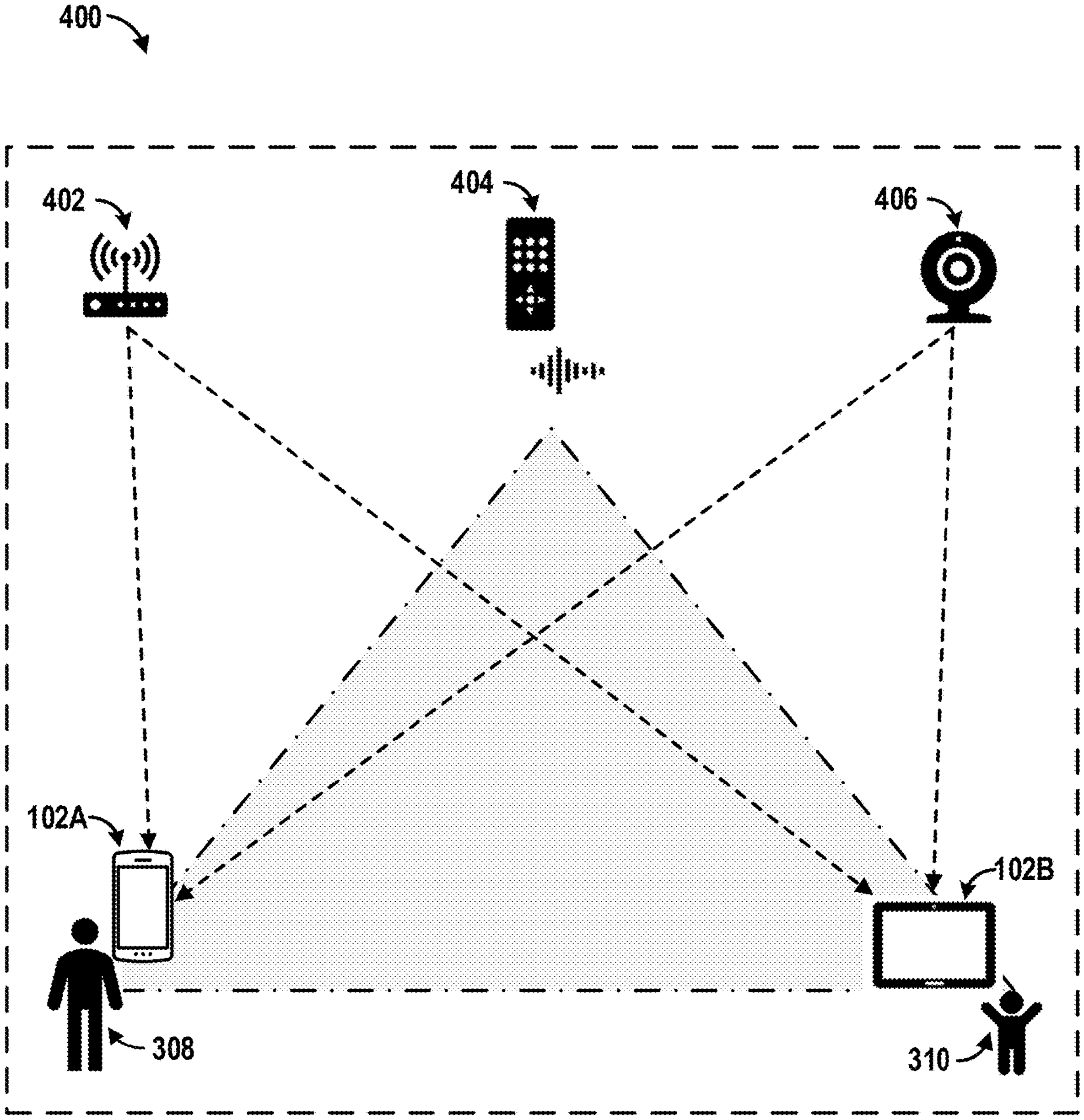
FIG. 4 shows example detection methods.

FIG. 4 shows example methods 400 of detecting users (e.g., adult user 308 and child user 310) within a proximity of the user devices (e.g., devices 102A-102B). One or more devices may be used to detect the presence of one or more users in proximity to the user devices. For example, the one or more devices may comprise one or more of a Wi-Fi enabled device 402 (e.g., a router, a gateway device, a mobile device, etc.), an audio capture device 404 (e.g., a mobile device, a remote control device, etc.), and/or an image capture device 406 (e.g., a camera, a mobile device, etc.). In example, the user devices may include the one or more devices used to detect the presence of the one or more users. The Wi-Fi enabled device 402 may be configured to detect users (e.g., adult user 308 and/or child user 310) based on using Wi-Fi signals to detect events or changes in an environment of the Wi-FI enabled device 402 such as motion, gesture recognition, and/or biometric measurements (e.g., breathing). For example, the Wi-Fi enabled device 402 may be configured to detect the presence of users (e.g., adult user 308 and/or child user 310) based on calculating a head-to-body ratio of each user to distinguish between the adult users 308 and the child users 310. The audio capture device 404 may be configured to capture voices of users (e.g., adult user 308 and/or child user 310) in an environment of the audio capture device 404 and identify whether each user is an adult or a child based on the voices of the users. In an example, the audio capture devices 404 may capture the sound of the users'footsteps to distinguish between the adult users and the child users. For example, the intensity of the tap sound caused by the footsteps may be used to determine the weight of the user in order to distinguish between an adult user and a child user. For example, an adult user may be associated with a high intensity tap sound than a child user due to the higher probability that the adult user is heavier than the child user. In addition, the number of tap sounds may to cover a distance may be determined in order to distinguish between an adult user and a child user. For example, a child user may be associated with a high number of tap sounds as compared to an adult user. The image capture device 406 may be configured to capture images of users (e.g., adult user 308 and/or child user 310) in an environment of the image capture device 406 to determine a distance between each user and distinguish between adult users and child users. The user devices (e.g., devices 102A-102B) may receive information from each of the one or more devices (e.g., the Wi-Fi enabled device 402, the audio capture device 404, and/or the image capture device 406) to determine each user's (e.g., adult user 308 and/or child user 310) proximity to the user devices. For example, the user devices (e.g., devices 102A-102B) may determine a number of steps taken to cover a distance, a number of tap sounds generated while a user is walking, and/or information associated with the distances between the users and the user devices to determine the proximities of the users relative to the user devices. The user devices may determine whether to apply a content filter to a requested content item based on the proximities of the users to the users devices. As an example, based on the adult user 308 within proximity to the device 102A, the device 102A may access a manifest associated with an unfiltered version of a requested content item to output the unfiltered version of the content item to the adult user 308. As an example, based on the child user 310 within proximity to the device 102B, the device 102B may access a manifest associated with a filtered version of a requested content item to output the filtered version of the content item to the child user 310.

Figure 5:
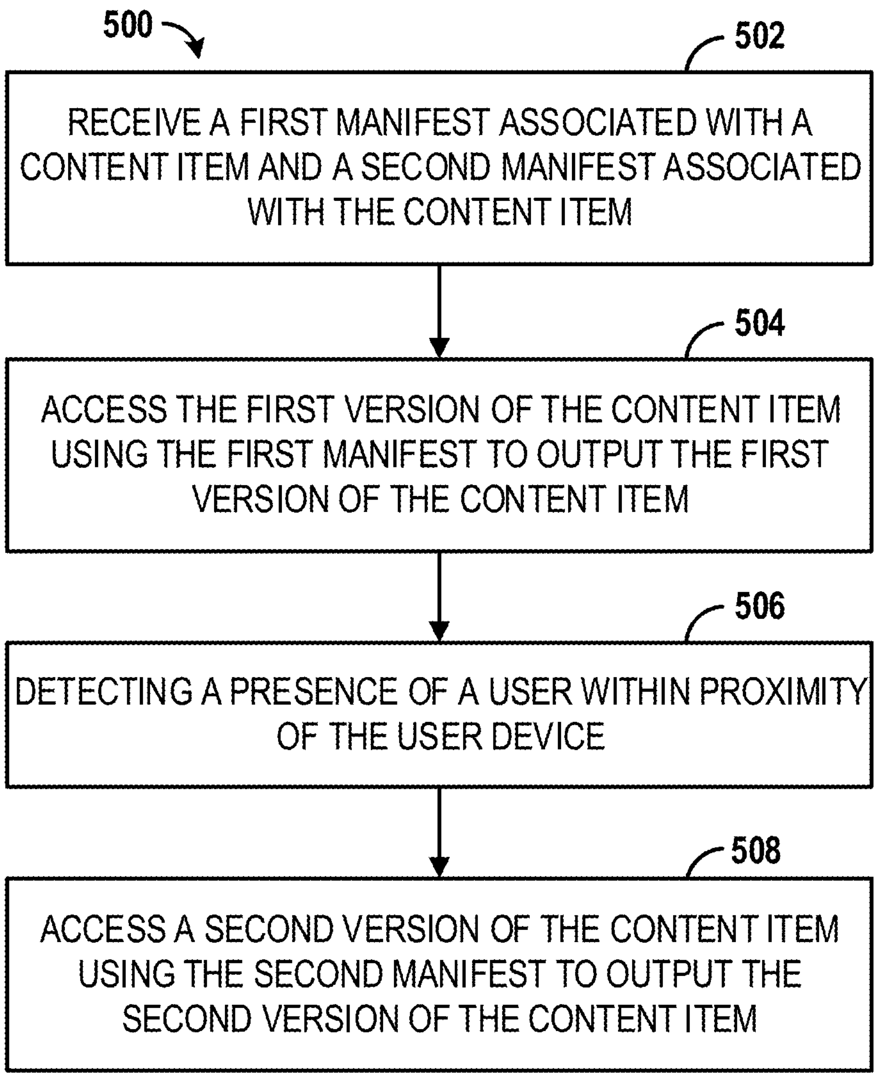
FIG. 5 shows a flowchart of an example method.

FIG. 5 shows a flowchart of an example method 500 for applying a content filter to a content item output via a user device. Method 500 may be implemented, for example, by a user device (e.g., device 102A, device 102B, network device 116, etc.). At step 502, a first manifest associated with the content item and a second manifest associated with the content item may be received based on a request for a content item. For example, a user device (e.g., device 102A, device 102B, network device 116, etc.) may receive the first manifest associated with the content item and the second manifest associated with the content item may be received based on the request for the content item. For example, the user device may store the first manifest and the second manifest. The first manifest may represent a first version of the content item and the second manifest may represent a second version of the content item. The first version may be associated with an adult version of the content item comprising an unfiltered version of the content item and the second version may be associated with a child version of the content item comprising a filtered version of the content item. The filtered version of the content item may comprise one or more filtered portions of the content item associated with explicit content.

At step 504, the first version of the content item may be accessed using the first manifest to output the first version of the content item. For example, the user device (e.g., device 102A, device 102B, network device 116, etc.) may access the first version of the content item using the first manifest to output the first version of the content item. For example, the user device may access a URL or other reference in the first manifest to generate a request for a first portion of the content item associated with the first version of the content item. The user device may receive and output the first portion of the content item based on the request. As an example, the first version of the content item may be accessed using the first manifest to output the first version of the content item based on detecting a presence of an adult user within proximity of the user device. The proximity of the adult user may be determined based on one or more of detecting a proximity of a user device of the adult user, Wi-Fi sensing, capturing a sound of the adult user, or capturing an image of the adult user.

At step 506, a presence of a user within proximity of the user device may be detected during the output of the first version of the content item. For example, the user device (e.g., device 102A, device 102B, network device 116, etc. via one or more sensor devices) may detect the presence of the user within the proximity of the user device during the output of the first version of the content item. The proximity of the user may be determined based on one or more of detecting a proximity of a user device of a user, Wi-Fi sensing, capturing a sound of a user, or capturing an image of a user.

At step 508, the second version of the content item may be accessed using the second manifest to output the second version of the content item based on the presence of the user. For example, the user device (e.g., device 102A, device 102B, network device 116, etc.) may access the second version of the content item using the second manifest to output the second version of the content item based on the presence of the user. For example, the user device may access a URL or other reference in the second manifest to generate a request for a second portion of the content item associated with the second version of the content item. The user device may receive and output the second portion of the content item based on the request. In an example, the second version of the content item may be accessed using the second manifest based on the presence of the user comprising a child user. As an example, the user device may output the second version of the content item at a time point in the content item associated with the detection of the presence of the user within the proximity of the user device during the output of the first version of the content item.

Figure 6:
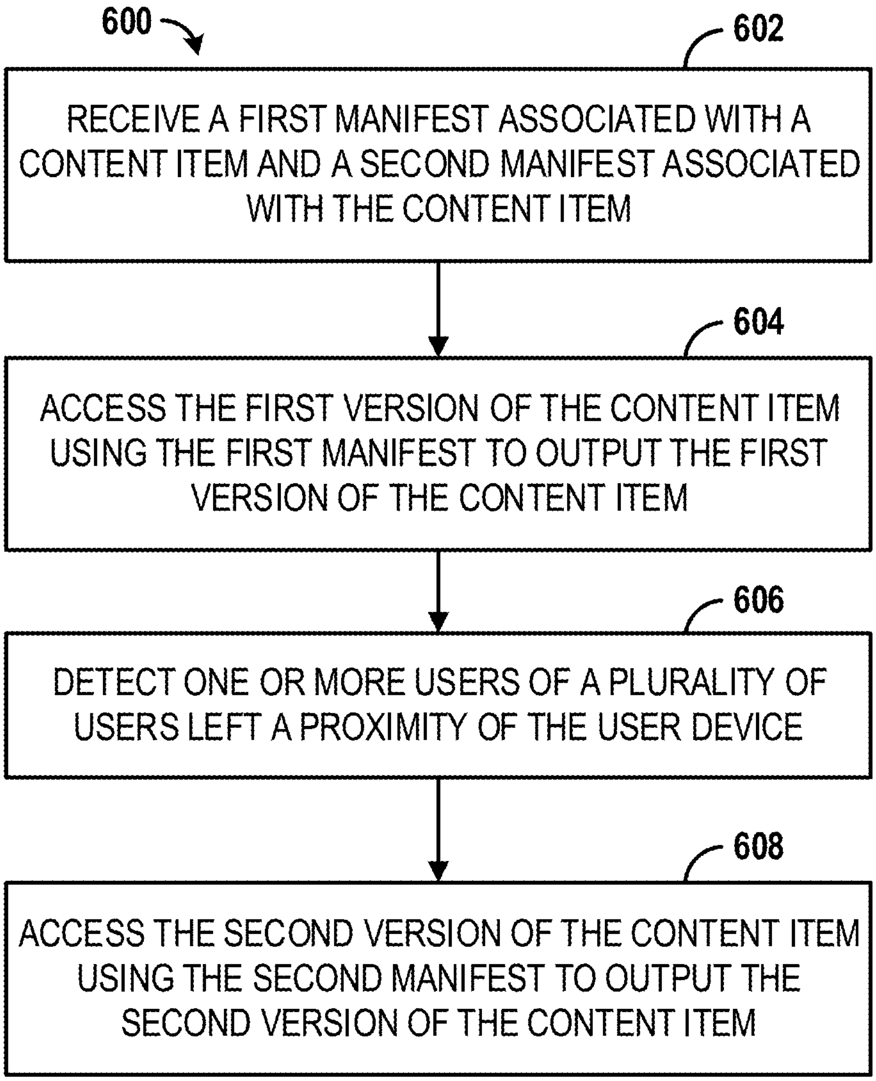
FIG. 6 shows a flowchart of an example method.

FIG. 6 shows a flowchart of an example method 600 for applying a content filter to a content item output via a user device. Method 600 may be implemented, for example, by a user device (e.g., device 102A, device 102B, network device 116, etc.). At step 602, a first manifest associated with the content item and a second manifest associated with the content item may be received based on a request for a content item. For example, a user device (e.g., device 102A, device 102B, network device 116, etc.) may receive the first manifest associated with the content item and the second manifest associated with the content item based on the request for the content item. For example, the user device may store the first manifest and the second manifest. The first manifest may represent a first version of the content item and the second manifest may represent a second version of the content item. The first version may be associated with a child version of the content item comprising a filtered version of the content item and the second version may be associated with an adult version of the content item comprising an unfiltered version of the content item. The filtered version of the content item may comprise one or more filtered portions of the content item associated with explicit content.

At step 604, the first version of the content item may be accessed using the first manifest to output the first version of the content item. For example, the user device (e.g., device 102A, device 102B, network device 116, etc.) may access the first version of the content item using the first manifest to output the first version of the content item. For example, the user device may access a URL or other reference in the first manifest to generate a request for a first portion of the content item associated with the first version of the content item. The user device may receive and output the first portion of the content item based on the request. As an example, the first version of the content item may be accessed using the first manifest to output the first version of the content item based on detecting a presence of at least one child user of a plurality of users within proximity to the user device. The proximity of the plurality of users may be determined based on one or more of detecting a proximity of a user device of each user of the plurality of users, Wi-Fi sensing, capturing a sound of each user of the plurality of users, or capturing an image of each user of the plurality of users.

At step 606, one or more users of the plurality of users left a proximity of the user device may be detected during the output of the first version of the content item. For example, the user device (e.g., device 102A, device 102B, network device 116, etc. via one or more sensor devices) may detect the one or more users of the plurality of users that left the proximity of the user device during the output of the first version of the content item.

At step 608, the second version of the content item may be accessed using the second manifest to output the second version of the content item based on the one or more users leaving the proximity of the user device. For example, the user device (e.g., device 102A, device 102B, network device 116, etc.) may access the second version of the content item using the second manifest to output the second version of the content item based on the one or more users leaving the proximity of the user device. For example, the user device may access a URL or other reference in the second manifest to generate a request for a second portion of the content item associated with the second version of the content item. The user device may receive and output the second portion of the content item based on the request. In an example, the second version of the content item may be accessed using the second manifest based the one or more users leaving the proximity of the user device comprising child users and based on the remaining users of the plurality of users in proximity of the user device comprising adult users. As an example, the user device may output the second version of the content item at a time point in the content item associated with the detection of the one or more users leaving the proximity of the user device during the output of the first version of the content item.

Figure 7:
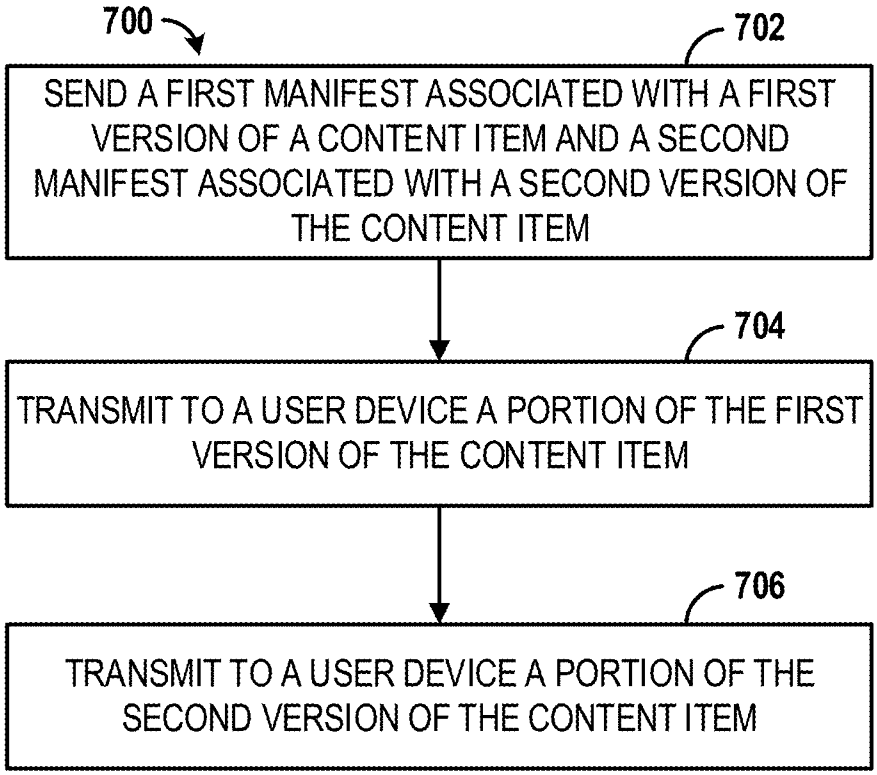
FIG. 7 shows a flowchart of an example method.

FIG. 7 shows a flowchart of an example method 700 for applying a content filter to a content item output via a user device. Method 700 may be implemented, for example, by a computing device (e.g., computing device 104, a server, a headend device, etc.). At step 702, a first manifest associated with a first version of the content item and a second manifest associated with a second version of the content item may be sent based on a request for a content item. For example, a computing device (e.g., computing device 104, a server, a headend device, etc.) may send the first manifest associated with the first version of the content item and the second manifest associated with the second version of the content item may be sent based on the request for the content item. A user device may receive and store the first manifest and the second manifest. One or more of the first version or the second version may be associated with an adult version of the content item comprising an unfiltered version of the content item or a child version of the content item comprising a filtered version of the content item.

At step 704, a portion of the first version of the content item may be transmitted to the user device based on a request for the first version of the content item using information in the first manifest. For example, the computing device (e.g., computing device 104, a server, a headend device, etc.) may transmit the portion of the first version of the content item based on the request for the first version of the content item using information in the first manifest. For example, the user device may access the first manifest to request the portion of the first version of the content item based on detecting a first user within proximity to the user device. The first user may comprise an adult user or a child user. As an example, based on a determination that the first user comprises an adult user, the user device may send to the computing device a request for the adult/unfiltered version of the content item based on accessing a manifest associated with the adult/unfiltered version of the content item. The computing device may send a first portion of the adult/unfiltered version of the content item to the user device based on the request. As an example, based on a determination that the first user comprises a child user, the user device may send to the computing device a request for the child/filtered version of the content item based on accessing a manifest associated with the child/filtered version of the content item. The computing device may send a first portion of the child/filtered version of the content item to the user device based on the request.

At step 706, a portion of the second version of the content item may be transmitted to the user device based on a request for the second version of the content item using information in the second manifest. For example, the computing device (e.g., computing device 104, a server, a headend device, etc.) may transmit portion of the second version of the content item based on the request for the second version of the content item using information in the second manifest. For example, the user device may access the second manifest to request the portion of the second version of the content item based on detecting a second user within proximity to the user device. The second user may comprise an adult user or a child user. In an example, the portion of the second version of the content item may be associated with a time point in the content item associated with a detection of a user within proximity of the user device during output of the portion of the first version of the content item. As an example, if the user device detects a child user during output of the adult/unfiltered version of the content item, the user device may send to the computing device a request for a child/filtered version of the content item based on accessing a manifest associated with the child/filtered version of the content item. The computing device may send a second portion of the content item associated with the child/filtered version of the content item to the user device based on the request. As an example, if the user device detects that a child user has left proximity of the user device and only an adult user remains in proximity of the user device, during output of the child/filtered version of the content item, the user device may send to the computing device a request for an adult/unfiltered version of the content item based on accessing a manifest associated with the adult/unfiltered version of the content item. The computing device may send a second portion of the content item associated with the adult/unfiltered version of the content item to the user device based on the request.

Figure 8:
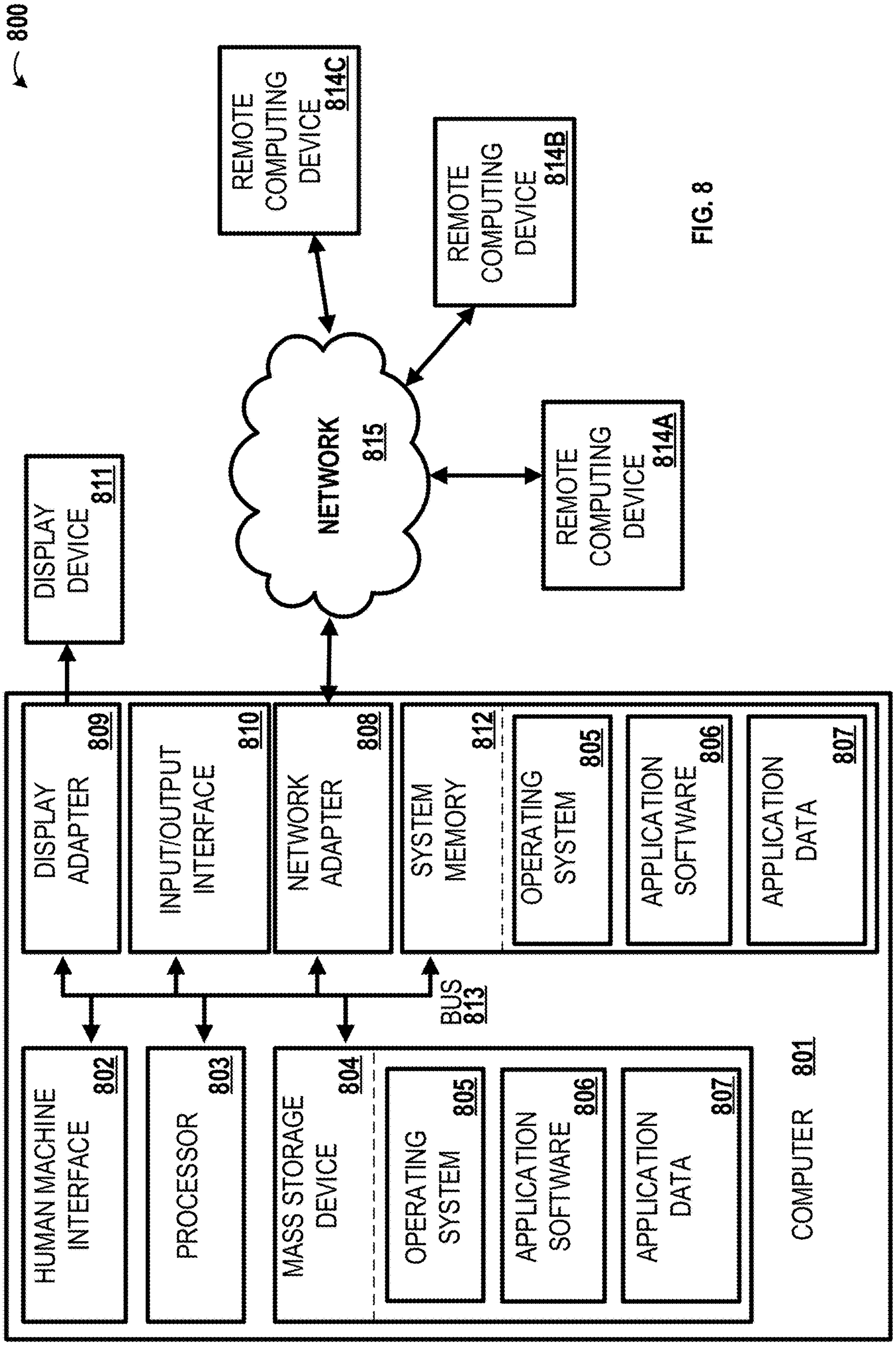
FIG. 8 shows a block diagram of an example system and computing device.

FIG. 8 is a block diagram illustrating an example computing device. The methods and systems can be implemented on a computer 801 as illustrated in FIG. 8 and described below. By way of example, user device 102A-102B, the network devices 116A-116B, and computing device 104 of FIG. 1 can be a computer 801 as illustrated in FIG. 8. Similarly, the methods and systems disclosed can utilize one or more computers to perform one or more functions in one or more locations. FIG. 8 is a block diagram illustrating an exemplary operating environment 800 for performing the disclosed methods. This exemplary operating environment 800 is only an example of an operating environment and is not intended to suggest any limitation as to the scope of use or functionality of operating environment architecture. Neither should the operating environment 800 be interpreted as having any dependency or requirement relating to any one or combination of components illustrated in the exemplary operating environment 800.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 801. The computer 801 can comprise one or more components, such as one or more processors 803, a system memory 812, and a bus 813 that couples various components of the computer 801 including the one or more processors 803 to the system memory 812. In the case of multiple processors 803, the system can utilize parallel computing.

The bus 813 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and one or more of the components of the computer 801, such as the one or more processors 803, a mass storage device 804, an operating system 805, application software 806, application data 807, a network adapter 808, system memory 812, an Input/Output Interface 810, a display adapter 809, a display device 811, and a human machine interface 802, can be contained within one or more remote computing devices 814A-814C at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 can comprise computer readable media in the form of volatile memory, such as random access memory (RAM), and/or non-volatile memory, such as read only memory (ROM). The system memory 812 typically can comprise data such as application data 807 and/or program modules such as operating system 805 and application software 806 that are accessible to and/or are operated on by the one or more processors 803.

The computer 801 can also comprise other removable/non-removable, volatile/non-volatile computer storage media. By way of example, the computer 801 can comprise a mass storage device 804 which can offer non-volatile storage of computer code, computer readable instructions, data structures, program modules, and other data for the computer 801. For example, a mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, an operating system 805 and application software 806. One or more of the operating system 805 and application software 806 (or some combination thereof) can comprise elements of the programming and the application software 806. Application data 807 can also be stored on the mass storage device 804. Application data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 815.

The user can enter commands and information into the computer 801 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices can be connected to the one or more processors 803 via a human machine interface 802 that is coupled to the bus 813, but can be connected by other interface and bus structures, such as a parallel port, game port, an IEEE 1394 Port (also known as a Firewire port), a serial port, network adapter 808, and/or a universal serial bus (USB).

A display device 811 can also be connected to the bus 813 via an interface, such as a display adapter 809. It is contemplated that the computer 801 can have more than one display adapter 809 and the computer 801 can have more than one display device 811. For example, a display device 811 can be a monitor, an LCD (Liquid Crystal Display), light emitting diode (LED) display, television, smart lens, smart glass, and/or a projector. In addition to the display device 811, other output peripheral devices can comprise components such as speakers (not shown) and a printer (not shown) which can be connected to the computer 801 via Input/Output Interface 810. Any step and/or result of the methods can be output in any form to an output device. Such output can be any form of visual representation, including, but not limited to, textual, graphical, animation, audio, tactile, and the like. The display 811 and computer 801 can be part of one device, or separate devices.

The computer 801 can operate in a networked environment using logical connections to one or more remote computing devices 814A, 814B, and 814C. By way of example, a remote computing device 814A-814C can be a personal computer, a computing station (e.g., a workstation), a portable computer (e.g., a laptop, a mobile phone, a tablet device), a smart device (e.g., a smartphone, a smart watch, an activity tracker, a smart apparel, a smart accessory), a security and/or monitoring device, a server, a router, a network computer, a peer device, an edge device or other common network node, and so on. Logical connections between the computer 801 and a remote computing device 814A-814C can be made via a network 815, such as a local area network (LAN) and/or a general wide area network (WAN). Such network connections can be through a network adapter 808. A network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components can reside at various times in different storage components of the computer 801, and are executed by the one or more processors 803 of the computer 801. An implementation of application software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., a genetic algorithms), swarm intelligence (e.g., an ant algorithms), and hybrid intelligent systems (e.g., expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:

receiving, by a user device, based on a request for a content item, a first manifest associated with the content item and a second manifest associated with the content item, wherein the first manifest represents a first version of the content item and the second manifest represents a second version of the content item;

accessing, based on detecting a presence of a first user, the first version of the content item using the first manifest to output the first version of the content item; and accessing, based on detecting the presence of a second user during the output of the first version of the content item, the second version of the content item using the second manifest to output the second version of the content item.

2. The method of claim 1, wherein the first version is associated with an adult version of the content item comprising an unfiltered version of the content item, and wherein the second version is associated with a child version of the content item comprising a filtered version of the content item.

3. The method of claim 2, wherein the filtered version of the content item comprises one or more filtered portions of the content item associated with explicit content.

4. The method of claim 1, wherein the user device stores the first manifest and the second manifest.

5. The method of claim 1, wherein one or more of the presence of the first user or the presence of the second user are detected based on one or more of detecting a proximity of a user device of a user, Wi-Fi sensing, capturing a sound of a user, or capturing an image of a user.

6. The method of claim 1, wherein the first user comprises an adult user.

7. The method of claim 1, wherein the second user comprises a child user.

8. The method of claim 1, wherein the user device outputs the second version of the content item at a time point in the content item associated with the detection of the presence of the second user during the output of the first version of the content item.

9. A method comprising:

receiving, by a user device, based on a request for a content item, a first manifest associated with the content item and a second manifest associated with the content item, wherein the first manifest represents a first version of the content item and the second manifest represents a second version of the content item;

accessing, based on detecting a presence of a plurality of users, the first version of the content item using the first manifest to output the first version of the content item; and accessing, based on detecting one or more users of the plurality of users leaving a proximity of the user device, the second version of the content item using the second manifest to output the second version of the content item.

10. The method of claim 9, wherein the first version is associated with a child version of the content item comprising a filtered version of the content item, and wherein the second version is associated with an adult version of the content item comprising an unfiltered version of the content item.

11. The method of claim 10, wherein the filtered version of the content item comprises one or more filtered portions of the content item associated with explicit content.

12. The method of claim 9, wherein the user device stores the first manifest and the second manifest.

13. The method of claim 9, wherein the presence of the plurality of users is detected based on one or more of detecting a proximity of a user device of each user, Wi-Fi sensing, capturing a sound of each user, or capturing an image of each user.

14. The method of claim 9, wherein accessing, based on detecting the presence of the plurality of users, the first version of the content item using the first manifest comprises accessing, based on detecting a presence of at least one child user of the plurality of users, the first version of the content item using the first manifest.

15. The method of claim 9, wherein accessing, based on the one or more users of the plurality of users leaving the proximity of the user device, the second version of the content item using the second manifest comprises accessing, based on detecting one or more child users of the plurality of users leaving the proximity of the user device and based on detecting that the remaining users of the plurality of users within the proximity of the user device are adult users, the second version of the content item using the second manifest.

16. The method of claim 9, wherein the user device outputs the second version of the content item at a time point in the content item associated with the detection of the one or more users leaving the proximity of the user device during the output of the first version of the content item.

17. A method comprising:

sending, by a computing device, based on a first request for a content item, a first manifest associated with a first version of the content item and a second manifest associated with a second version of the content item;

transmitting to a user device, based on a second request for the first version of the content item using information in the first manifest, a portion of the first version of the content item, wherein the second request is based on a detection of a presence of a first user within proximity of the user device; and transmitting to the user device, based on a third request for the second version of the content item using information in the second manifest, a portion of the second version of the content item, wherein the third request is based on a detection of a presence of a second user within proximity of the user device.

18. The method of claim 17, wherein the user device stores the first manifest and the second manifest.

19. The method of claim 17, wherein one or more of the first version or the second version is associated with an adult version of the content item comprising an unfiltered version of the content item or a child version of the content item comprising a filtered version of the content item.

20. The method of claim 17, wherein the user device accesses the first manifest to request the portion of the first version of the content item based on detecting the first user within proximity to the user device, and wherein the user device accesses the second manifest to request the portion of the second version of the content item based on detecting the second user within proximity to the user device.

21. The method of claim 20, wherein one or more of the first user or the second user comprises an adult user or a child user.

22. The method of claim 17, wherein the portion of the second version of the content item is associated with a time point in the content item associated with the detection of the second user within the proximity of the user device during output of the portion of the first version of the content item.

* * * * *